US012683812B2

(12) United States Patent　　(10) Patent No.:　US 12,683,812 B2
Tian　　(45) Date of Patent:　Jul. 14, 2026

(54) PHYSICALLY UNCLONABLE FUNCTION DEVICE AND METHOD FOR FABRICATING THE SAME

(71) Applicant: United Microelectronics Corp., Hsinchu (TW)

(72) Inventor: Yang Tian, Singapore (SG)

(73) Assignee: UNITED MICROELECTRONICS CORP., Hsinchu (TW)

( * ) Notice: Subject to any disclaimer, the term of this patent is extended or adjusted under 35 U.S.C. 154(b) by 345 days.

(21) Appl. No.: 18/607,602

(22) Filed: Mar. 18, 2024

(65) Prior Publication Data

US 2025/0267017 A1　　Aug. 21, 2025

(30) Foreign Application Priority Data

Feb. 16, 2024　　(TW) ................................. 113105468

(51) Int. Cl.
H04L 9/32　　(2006.01)
H03K 17/687　　(2006.01)
(52) U.S. Cl.
CPC ....... H04L 9/3278 (2013.01); H03K 17/6872 (2013.01)
(58) Field of Classification Search
None
See application file for complete search history.

(56) References Cited

U.S. PATENT DOCUMENTS

| | | | |
|---|---|---|---|
| 5,389,811 A * | 2/1995 | Poucher | ............... H10D 89/601 |
| | | | 257/374 |
| 10,971,236 B2 | 4/2021 | Okabe | |
| 11,102,016 B2 | 8/2021 | Hurwitz | |
| 2005/0224893 A1* | 10/2005 | Arai | ................... G11C 16/0433 |
| | | | 257/E21.209 |
| 2014/0179076 A1* | 6/2014 | Shinohara | .......... H10D 30/0413 |
| | | | 438/275 |
| 2016/0093623 A1* | 3/2016 | Luan | ........................ G11C 11/41 |
| | | | 257/133 |
| 2016/0182045 A1* | 6/2016 | Mai | ........................ H04L 9/3278 |
| | | | 326/8 |
| 2021/0021435 A1* | 1/2021 | Hurwitz | ................ H04L 9/3278 |
| 2021/0250191 A1 | 8/2021 | O'Connell | |

* cited by examiner

*Primary Examiner* — Khaja Ahmad
(74) *Attorney, Agent, or Firm* — WPAT, PC

(57)　　ABSTRACT

A PUF device includes a first transistor that has a first well with a first conductivity and a first channel region with a second conductivity, a second transistor that has a second well and a second channel region both with the first conductivity, and a reading circuit. When a gate-source voltage applied to these transistors is equal to 0, the first transistor and the second transistor are both in an off state. The reading circuit is electrically connected to the first transistor and the second transistor, and is used to read a plurality of first conduction states of the first transistors and the second transistor, and then to output a first set of numerical values.

10 Claims, 7 Drawing Sheets

VG=1
VS=0

PHYSICALLY UNCLONABLE FUNCTION DEVICE AND METHOD FOR FABRICATING THE SAME

BACKGROUND

This application claims the benefit of Taiwan Application Serial No. 113105468 filed at Feb. 16, 2024 the subject matter of which is incorporated herein by reference.

Technical Field

The disclosure relates to a semiconductor device and the method for fabricating the same, and more particularly to a physically unclonable function device and the method for fabricating the same.

Description of Background

With the increasing popularity of Internet of Things (IOT) technology, different Internet devices (such as, mobile communication devices, sensors installed on the devices, and their built-in software) can communicate with each other through the Internet, by which more and more data can be stored and shared in digital form, while providing the convenience of information integration. However, it also brings higher information security risks. Therefore, the security of the internet devices and the networks connecting there between is becoming more and more important.

Traditional IoT encryption technology is using an encryption mathematical model (algorithm) to encode the information or data to be protected into ciphertext, and store the cryptographic key, digital string or password established by the algorithm in a hardware apparatus. After receiving the ciphertext, the hardware apparatus decodes the data back into plaintext based on the stored cryptographic key, digital string, or algorithm. Unauthorized persons cannot guess the correct cryptographic key, nor can easily calculate or crack the correct string or password for the cryptographic key by using a computer to try possible combinations thereof.

However, the traditional encryption technology still has the risks that the user identities may be stolen, tampered with, and the password of the cryptographic key may be lost. Moreover, since the password is stored in the hardware apparatus, each multiply accumulate operation of the cryptographic key requires frequent and repeated access to the password from the memory of the hardware apparatus, which requires a large and additional operating cost (consumption of power and time).

Therefore, there is a need of providing an advanced forming method of the ReRAM array to obviate the drawbacks encountered from the prior art.

SUMMARY

One aspect of the present disclosure is to provide a physically unclonable function device, wherein the physically unclonable function device includes a first group of transistors and/or a second group of transistors as well as a reading circuit. The first group of transistors includes a first transistor and a second transistor, wherein the first transistor has a first well with a first conductivity and a first channel region with a second conductivity; and the second transistor has a second well and a second channel region both with the first conductivity. When a gate-source voltage applied to the first transistor and the second transistor is equal to 0, the first transistor and the second transistor are both in an off state.

The second group of transistors includes a third transistor and a fourth transistor, wherein the third transistor has a third well with the second conductivity and a third channel region with the first conductivity; and the fourth transistor has a fourth well and a fourth channel region both with the second conductivity. When a gate-source voltage applied to the third transistor and the fourth transistor is equal to 0, the third transistor and the fourth transistor are both in an on state. The reading circuit is electrically connected to the first group of transistors and/or the second group of transistors, and is used to read a plurality of first conduction states of the first group of transistors and/or the second group of transistors, and then to output a first set of numerical values.

Another aspect of the present disclosure is to provide a method for fabricating a physically unclonable function device, wherein the method includes steps as follows: Firstly, a plurality of transistors with substantially the same size are formed in a substrate, so that the plurality of transistors at least include a first group of transistors and/or a second group of transistors. The first group of transistors includes a first transistor and a second transistor, wherein the first transistor has a first well with a first conductivity and a first channel region with a second conductivity; and the second transistor has a second well and a second channel region both with the first conductivity. When a gate-source voltage applied to the first transistor and the second transistor is equal to 0, the first transistor and the second transistor are both in an off state. The second group of transistors includes a third transistor and a fourth transistor, wherein the third transistor has a third well with the second conductivity and a third channel region with the first conductivity; and the fourth transistor has a fourth well and a fourth channel region both with the second conductivity. When a gate-source voltage applied to the third transistor and the fourth transistor is equal to 0, the third transistor and the fourth transistor are both in an on state. A reading circuit is then formed in the substrate to electrically connect the first group of transistors and/or the second group of transistors to read a plurality of first conduction states of the first group of transistors and/or the second group of transistors, and then to output a first set of numerical values.

In accordance with the aforementioned embodiments of the present disclosure, a physically unclonable function device and the method for fabricating the same are provided. At least one pair of semiconductor transistors including an enhancement-mode metal-oxide-semiconductor (MOS) transistor and a depletion-mode MOS transistor with the same electrical conductivity are firstly formed in the substrate. By controlling the ion implantation process for forming the doped channel regions of these transistors to make the size of the doped well regions and doped channel regions of the transistors substantially equal to the critical dimensions of the reticles used to form these doped regions, so as to result in at least one of the enhancement-mode MOS transistor and depletion-mode MOS transistor failed, due to process variation. The conduction states of these transistors can be then read by a reading circuit, and a set of numerical values, which serves as an identifier to verify the identity of the device can be outputted.

When a hardware apparatus with a built-in physically unclonable function device receives the external ciphertext encrypted with this identification code, a verification can be perform immediately based on the identifier and then the external ciphertext can be decoded and back-translated into plain text. This can prevent the loss of the cryptographic key, and prevent the user's identity and digital data from being stolen or tampered with, thereby reducing the risks of system security. Because the identifier provided by the physically unclonable function device is a native cryptographic key generated directly in the hardware apparatus and introducing random variables through the process for manufacturing the hardware. In addition, both the decrypted entropy source and the native cryptographic key can be prepared within microsec, without the support of additional software. Such that the need for additional operation cost (such as the power consumption and accessing time) required by the traditional IoT encryption technology to frequent and repeated access the cryptographic key stored in the hardware apparatus can be omitted.

BRIEF DESCRIPTION OF THE DRAWINGS

The above objects and advantages of the present disclosure will become more readily apparent to those ordinarily skilled in the art after reviewing the following detailed description and accompanying drawings, in which.

DETAILED DESCRIPTION

Figures 1A, 1B, 1C:
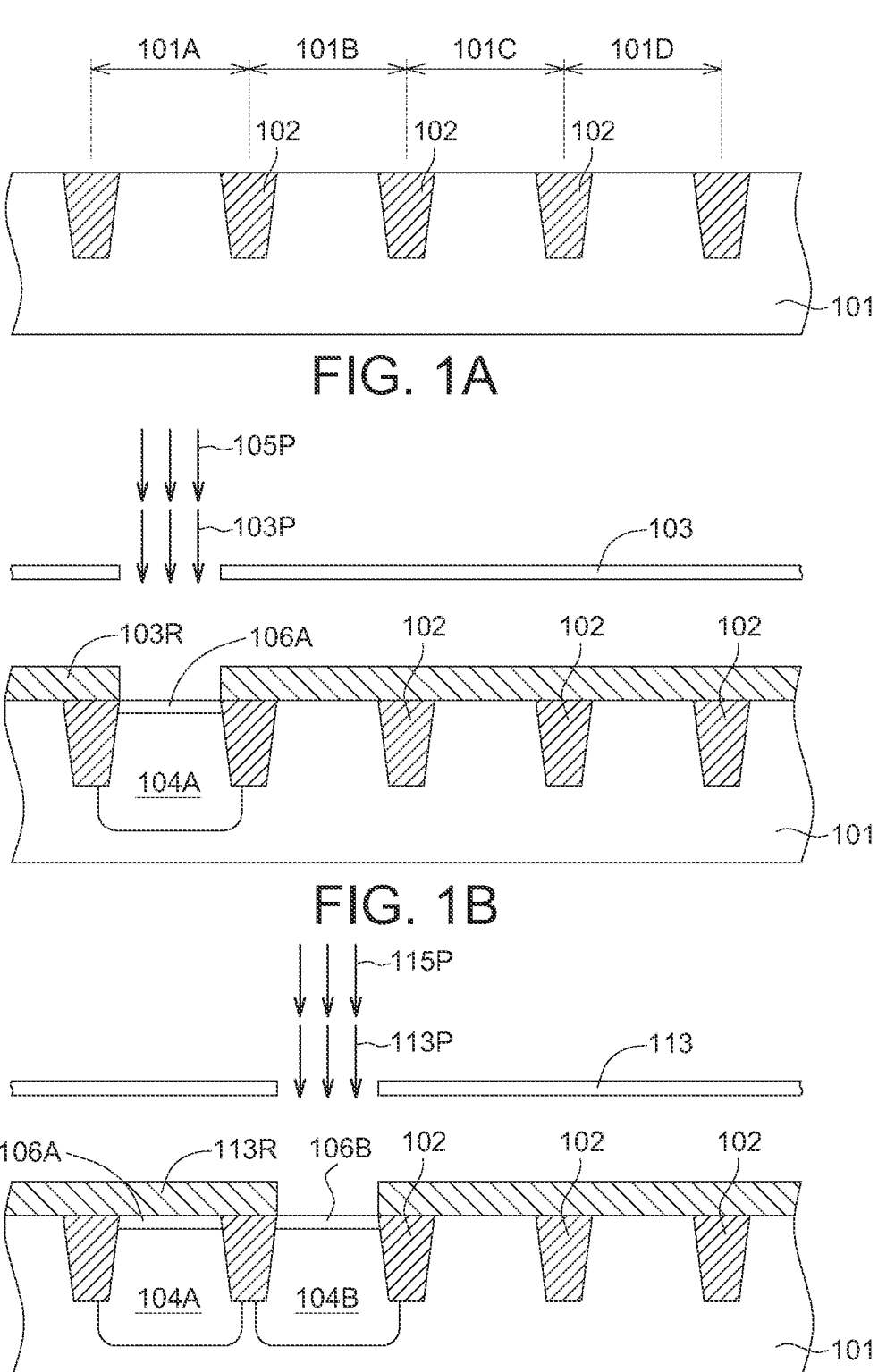
FIG. 1A to FIG. 1G are diagrams illustrating a series of process structures for producing of a physically unclonable function device, according to one embodiment of the present disclosure.

The embodiments as illustrated below provide a physically unclonable function device and the method for fabricating the same, which can prevent the loss of the cryptographic key, and prevent the user's identity and digital data from being stolen or tampered with. Such that the need for additional operation cost (such as the power consumption and accessing time) required by the traditional IoT encryption technology to frequent and repeated access the cryptographic key stored in the hardware apparatus can be omitted. The present disclosure will now be described more specifically with reference to the following embodiments illustrating the structure, method and arrangements thereof.

It is to be noted that the following descriptions of preferred embodiments of this disclosure are presented herein for purpose of illustration and description only. It is not intended to be exhaustive or to be limited to the precise form disclosed. Also, it is important to point out that there may be other features, elements, steps, and parameters for implementing the embodiments of the present disclosure which are not specifically illustrated. Thus, the descriptions and the drawings are to be regard as an illustrative sense rather than a restrictive sense. Various modifications and similar arrangements may be provided by the persons skilled in the art within the spirit and scope of the present disclosure. In addition, the illustrations may not be necessarily drawn to scale, and the identical elements of the embodiments are designated with the same reference numerals.

FIG. 1A to FIG. 1G are diagrams illustrating a series of process structures for producing of a physically unclonable function device 100, according to one embodiment of the present disclosure. In some embodiments of the preset disclosure, the method for manufacturing the physically unclonable function device 100 includes steps as follows:

Firstly, a semiconductor substrate 101 is provided and then the semiconductor substrate 101 is divided into a plurality of device regions (for example, device regions 101A, 101B, 101C and 101D). in some embodiments of the preset disclosure, the semiconductor substrate 101 may be a silicon-containing substrate, such as a silicon wafer, a silicon-on-insulator (SOI) or other semiconductor substrate. For example, in the present embodiment, the semiconductor substrate 101 may be a silicon wafer; and by forming a plurality of shallow trench isolation structures 102 in the semiconductor substrate 101, at least four separated device regions 101A, 101B, 101C and 101D with substantially identical sizes are defined in the semiconductor substrate 101 (as shown in FIG. 1A).

Subsequently, a photoresist layer 103R is patterned using a reticle 103, and an ion implantation process 103P is performed using the patterned photoresist layer 103R to form a first well 104A with a first conductivity (e.g., P-type conductivity) in the device region 101A of the semiconductor substrate 101; then another ion implantation process 105P is performed to form a first doped channel area 106A with a second conductivity (e.g., N-type conductivity) in the first well 104A (as shown in FIG. 1B).

Another photoresist layer 113R is patterned using another reticle 113, and yet another ion implantation process 113P is performed using the patterned photoresist layer 113R to form a second well 104B with the first conductivity (e.g., P-type conductivity) in the device region 101B of the semiconductor substrate 101; then further another ion implantation process 115P is performed to form a second doped channel area 106B with the first conductivity (e.g., P-type conductivity) in the second well 104B (as shown in FIG. 1C).

Figure 1D:
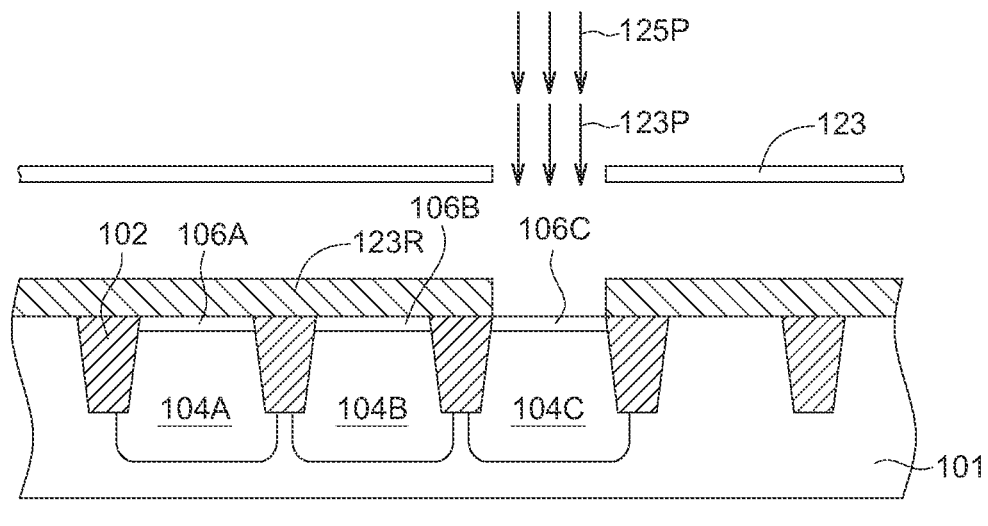

Yet another photoresist layer 123R is patterned using yet another reticle 123, and yet another ion implantation process 123P is performed using the patterned photoresist layer 123R to form a third well 104C with the second conductivity (e.g., N-type conductivity) in the device region 101C of the semiconductor substrate 101; then further another ion implantation process 125P is performed to form a third doped channel area 106C with the first conductivity (e.g., P-type conductivity) in the third well 104C (as shown in FIG. 1D).

Figure 1E:
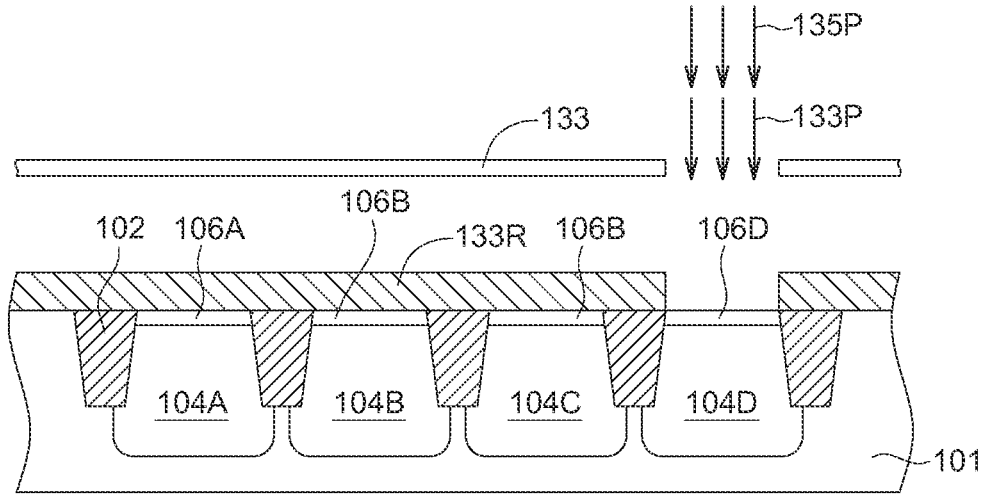

Yet another photoresist layer 133R is patterned using yet another reticle 133, and yet another ion implantation process 133P is performed using the patterned photoresist layer 133R to form a fourth well 104D with the second conductivity (e.g., N-type conductivity) in the device region 101D of the semiconductor substrate 101; then further another ion implantation process 135P is performed to form a fourth doped channel area 106S with the second conductivity (e.g., N-type conductivity) in the fourth well 104D (as shown in FIG. 1E).

Of note that, the operation sequence of the above-mentioned ion implantation processes 103P and 105P performed in the device region 101A, the implantation processes 113P and 115P performed in the device region 101B, the implantation processes 123P and 115P performed in the device region 101C, the ion implantation processes 103P and 115P performed in the device 101C and the implantation processes 133P and 135P performed in the device 101D is not limited. Those person with ordinary skill in the art can adjust it according to the needs of the product characteristic of the physically unclonable function device 100 and/or the manufacturing and/or design requirements of the same.

In addition, the sizes of the device region 101A and the first well 104A are substantially equal to the critical dimension (CD) of the reticle 103. The sizes of the device region 101B and the second well 104B are substantially equal to the CD of the reticle 113. The sizes of the device region 101C and the third well 104C are substantially equal to the CD of the reticle 123. The sizes of the device region 101D and the fourth well 104D are substantially equal to the CD of the reticle 133. The sizes of first doped channel region 106A is substantially equal to the CD of the reticle 105. The size of the second doped channel region 106B is substantially equal to the CD of the reticle 115. The size of the third doped channel region 106C is substantially equal to the CD of the reticle 125. The size of the fourth doped channel region 106D is substantially equal to the CD of the reticle 135.

Figure 1F:
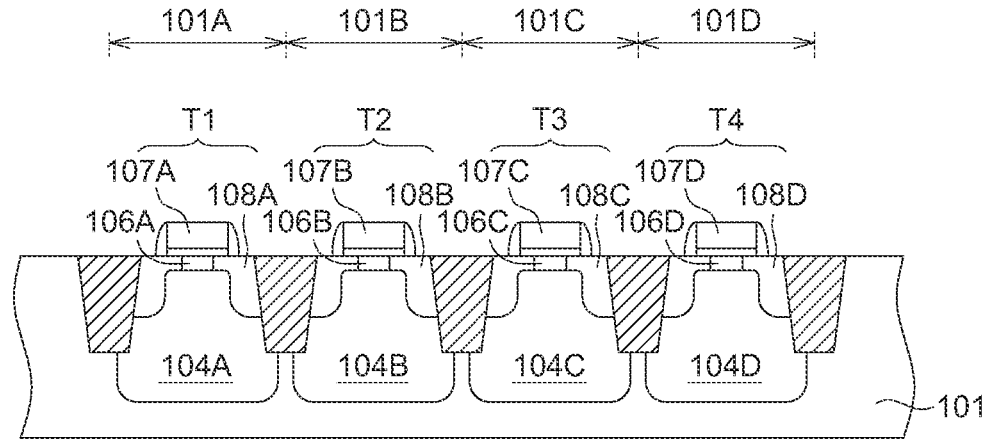

Next, gate structures 107A, 107B, 107C and 107C are formed respectively above the first doped channel region 106A, the second doped channel region 106B, the third doped channel region 106C and the fourth doped channel region 106D. And a plurality of ion doping processes (not shown) are performed to form a source/drain 108A, 108B, 108C and 108D respectively in the first well 104A, the second well 104B, the third well 104C and the fourth well 104D, thereby respectively forming transistors T1, T2, T3 and T4 in the device regions 101A, 101B, 101C and 101D (as shown in FIG. 1F).

Each doped region respectively formed by the ion implantation process 103P, 113P, 123P, 133P, 105P, 115P, 125P and 135P may be roughly the same as the critical size of the reticle used to form the same, and this may result in narrowing of processing window (i.e., the allowed tolerance of the process parameters), which makes the processes prone to variation, and in turn causes at least one of the transistors T1, T2, T3, and T4 to fail, due to the process variation, and be unable to perform its expected function.

For example, in the present embodiment, the transistor T1 can be a normal enhancement-mode N-type MOS (NMOS) transistor; the transistor T2 can be a failed depletion-mode NMOS transistor; the transistor T3 can be a failed enhancement-mode P-type metal-oxide-semiconductor (PMOS) transistor; and the transistor T4 can be a normal depletion-mode PMOS transistor.

Of note that, the conductivity of the transistors T1, T2, T3 and T4 can be altered. For example, in another embodiment, the first conductivity as described above may be referred to as N-type conductivity, and the second conductivity may be referred to as P-type conductivity. Suh that, the transistor T1 can be a normal enhancement-mode PMOS transistor, the transistor T2 can be a failed depletion-mode PMOS transistor; the transistor T3 can be a failed enhancement-mode NMOS transistor; and the transistor T4 may be a normal depletion-mode NMOS transistor.

Subsequently, a series of back-end-of-line (BEOL) processes (such as, a metal damascene process to form an interlayer dielectric layer 109 covering the device regions 101A, 101B, 101C and 101D, and form a metal interconnection structure 110 including a via plug 110P) are performed. And a read circuit 111 is then formed electrically connected to the transistors T1, T2, T3 and T4 through the metal interconnection structure 110, so as to complete the forming of the physically unclonable function device 100.

Figure 1G:
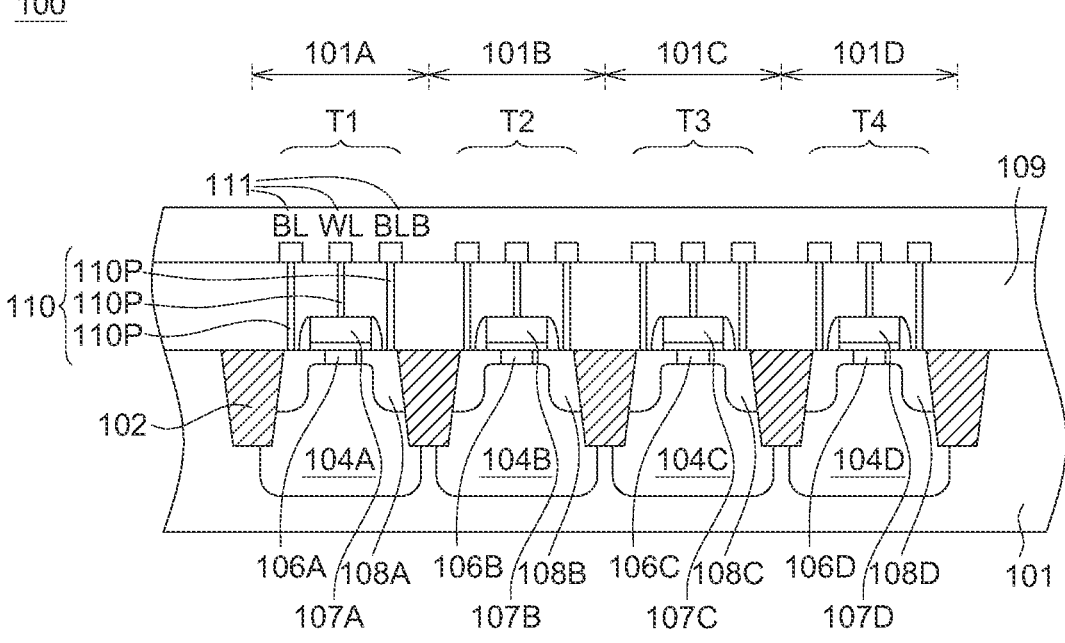

In the present embodiment, as shown in FIG. 1G, the reading circuit 111 includes a column decoder 111R, a row decoder 111C, a plurality of bit lines BL, a plurality of inverse bit-line-bars BLB and a plurality of word lines WL. One end of each word line WL is electrically connected to the column decoder 111R, and the other end is electrically connected to the gate of a corresponding one of the transistors T1, T2, T3 and T4 (e.g., the gate structure 107A of the transistor T1). One end of each bit line BL is electrically connected to the row decoder 111C, and the other end is electrically connected to the source of a corresponding one of the transistors T1, T2, T3, and T4 (e.g., the source of the source/drain 108A in the transistor T1). Each inverse bit-line-bar BLB is electrically connected to a drain of a corresponding one of transistors T1, T2, T3, and T4 (e.g., the drain of the source/drain 108A in the transistor T1).

Figure 2A:
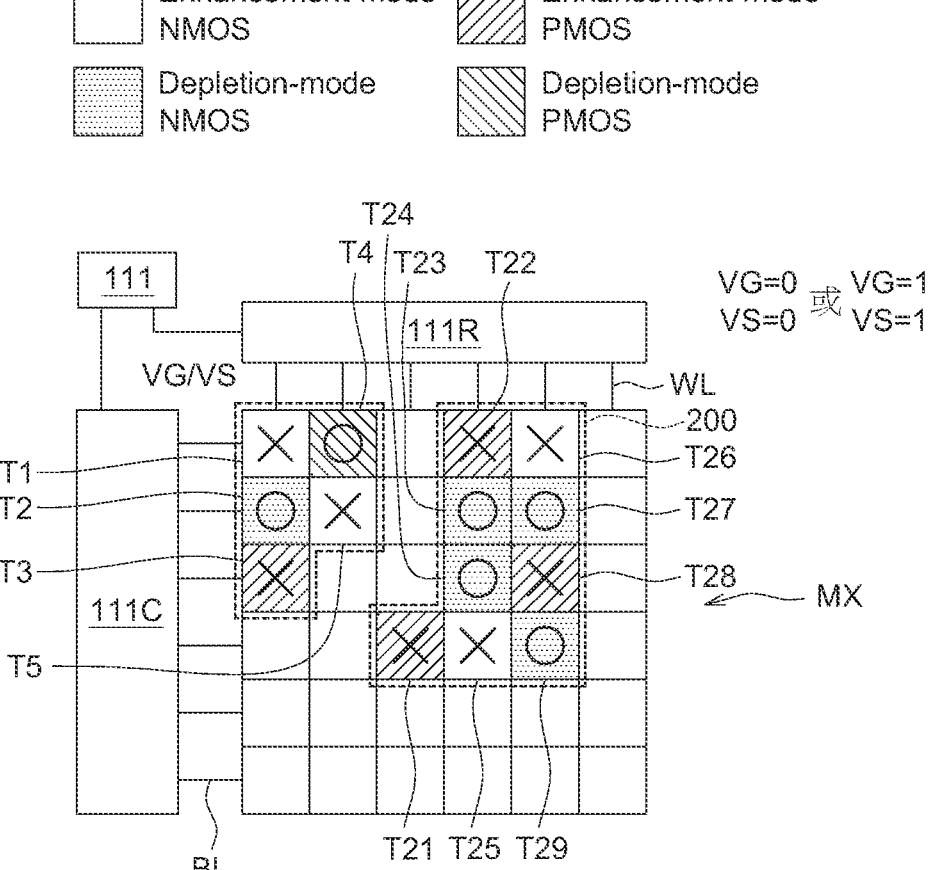
FIG. 2A is a block diagram illustrating a transistor array including at least one physically unclonable function device according to an embodiment of the present disclosure.

In some embodiments of the present disclosure, the transistors T1, T2, T3, and T4 form a transistor array, or are included in a larger transistor array. For example, in the present embodiment, in addition to the transistors T1, T2, T3, and T4, the physically unclonable function device 100 may further include other transistors (such as, an enhancement-mode NMOS transistor T5). And these transistors T1, T2, T3, T4 and T5 are included in a transistor array MX. Please refer to FIG. 2A. FIG. 2A is a block diagram illustrating a transistor array MA including at least one physically unclonable function device (e.g., the physically unclonable function device 100) according to one embodiment of the present disclosure.

As shown in FIG. 2A, the transistor array MX is a square array composed of 36 transistors in 6 rows and 6 columns. Each transistor is electrically connected to the column decoder 111R of the reading circuit 111 through a corresponding word line WL, and is electrically connected to the row decoder 111C of the reading circuit 111 through one end of a corresponding bit line BL. When the reading circuit 111 applies a gate voltage VG and a source voltage VS to each transistor in the transistor array MX through the word lines WL and the bit lines BL, the conduction of each transistor can be read. According to the conduction states of the transistors T1, T2, T3, T4 and T5 in the physically unclonable function device 100, a set of numerical values serving as an identifier to verify the identity of the physically unclonable function device 100 can be then outputted.

In some embodiments of the present disclosure, the transistor array MX may also include other physically unclonable function device 200 having the same structure as the physically unclonable function device 100. In other embodiments of the present disclosure, the physically unclonable function devices 100 and 200 can be integrated to form another more complex physically unclonable function device. The following will take the physically unclonable function device 100 as an example to illustrate the method for generating the identifier used to verify the identity of the physically unclonable function device 100.

Figure 2B:
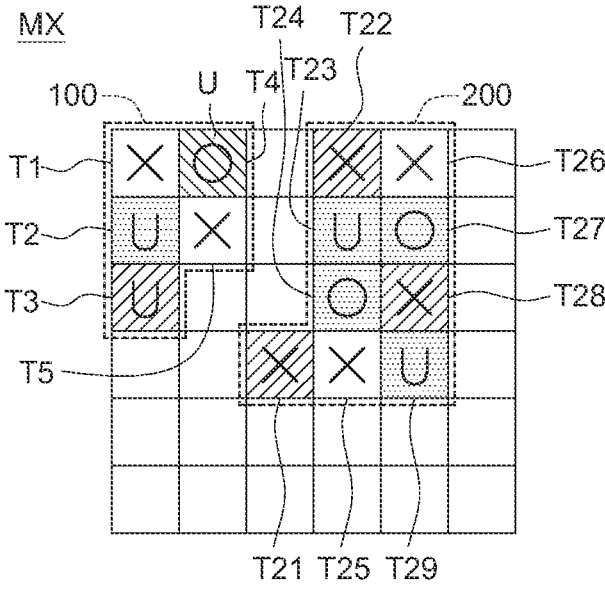
FIG. 2B is a diagram illustrating the conduction states of the transistors in the physically unclonable function device as depicted in FIG. 2A.

When the gate voltage VG and source voltage VS applied to each transistor are both 0 (VG=0/VS=0) or both 1 (VG=1/VS=1), theoretically the enhancement-mode NMOS transistors T1 and T5 and enhancement-mode PMOS transistor T3 should be in the off state (indicated by X); the depletion-mode NMOS transistor T2 and depletion-mode PMOS transistor T4 should be in the on state (indicated by O). However, in actual conditions, as shown in FIG. 2B, since the transistors T2 and T3 have failed (marked as U), thus the transistors T2 and T3, they are in the off state, no matter what the gate voltage VG and source voltage VS are applied thereto.

Figure 2C:
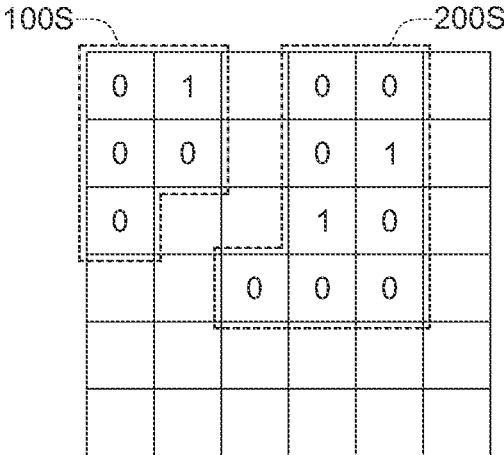
FIG. 2C is a diagram illustrating a binary code array (matrix) diagram corresponding to the conduction states of the transistors in the physically unclonable function device as depicted in FIG. 2B.

The reading circuit 111 assigns a state value of 0 to the off state and a state value of 1 to the on state based on the detected conduction state of each transistor. Such that, a binary code of 0 or 1 can be outputted according to the conduction state of each transistor T1, T2, T3, T4 and T5, and the outputted binary codes can be combined to provide a binary code array (matrix) diagram 100S (as shown in FIG. 2C). If the conduction states of the transistors T1, T2, T3, T4 and T5 are read in a predetermined order, a binary code sequence of 0,0,0,1,0 can be provided by the physically unclonable function device 100, and serve as an identifier to verify the identity of the physically unclonable function device 100.

The same method is also applicable to the physically unclonable function device 200 (including two failed transistors T23 and T29) for generating an identifier. When the gate voltage VG and source voltage VS applied to each transistor are both 0 (VG=0/VS=0) or both 1 (VG=1/VS=1), the physically unclonable function device 200 can provide a binary code array (matrix) diagram 200S (as shown in FIG. 2C). If the conduction states of the transistors T21-T29 in the physically unclonable function device 200 are read in the order of transistors T21-T29, a binary code sequence of 0,0,0,1,0,0,1,0,0 can be provided, by the physically unclonable function device 200, and serve as an identifier to verify the identity of the physically unclonable function device 200.

It should be appreciated that the reading circuit 111 can adopt a variety of reading modes to generate a variety of different identifiers that can verify the identities of the physically unclonable function devices 100 and 200. For example, in some embodiments of the present disclosure, the reading circuit 111 can apply different gate voltages VG and source voltages VS to each transistor in the transistor array MX to read the conduction state of each transistor, and then output another set of numeral values, serving as another identifier to verify the identities of the physically unclonable function devices 100 and 200. In other embodiments of the present disclosure, the identifiers generated by different reading modes can be used individually or cross-combined to generate a more complicate identifier to verify the identities of the physically unclonable function devices 100 and 200.

Figures 3A, 3B:
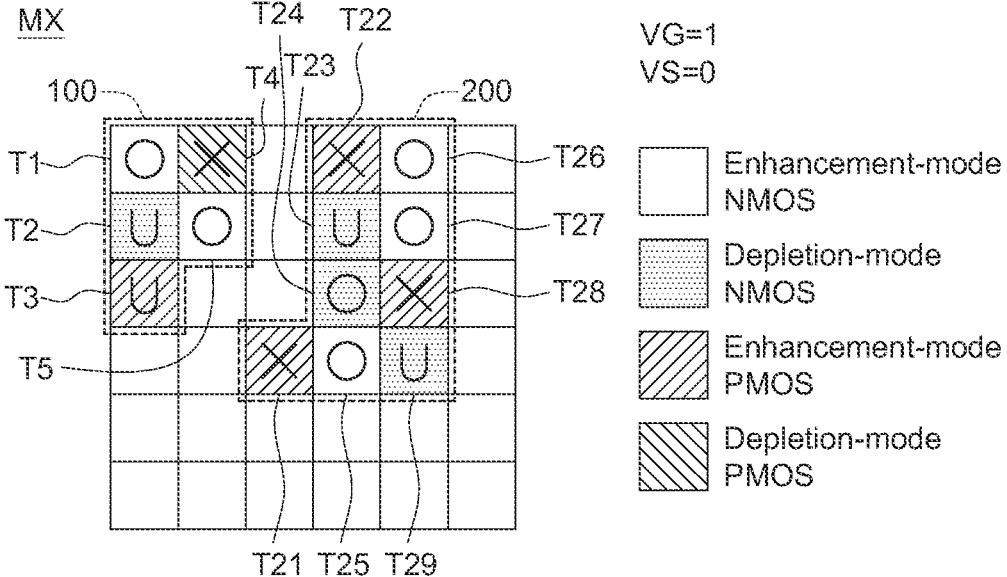
FIG. 3A is a diagram illustrating the conduction states of the transistors in the physically unclonable function device, when a gate voltage of 1V and a source voltage of 0V are applied to these transistors in the transistor array.
FIG. 3B is a diagram illustrating a binary code array (matrix) diagram corresponding to the conduction states of the transistors in the physically unclonable function device as depicted in FIG. 3A.

Referring to FIGS. 3A and 3B, FIG. 3A is a diagram illustrating the conduction states of the transistors T1, T2, T3, T4 and T5 in the physically unclonable function device 100 and the transistors T21-T29 in the physically unclonable function device 200, when a gate voltage VG of 1V (VG=1) and a source voltage VS of 0V (VS=0) are applied to these transistors in the transistor array MX; FIG. 3B is a diagram illustrating a binary code array (matrix) diagram 100S' and 200S' corresponding to the conduction states of the transistors T1, T2, T3, T4 and T5 in the physically unclonable function device 100 and the transistors T21-T29 in the physically unclonable function device 200 as depicted in FIG. 3A.

In the present embodiment, when a gate voltage of 1V (VG=1) and a source voltage of 0V (VS=0) are applied to each transistor in the transistor array MX, the enhancement-mode NMOS transistors T1 and T5 are in the on state (indicated by O); the depletion-mode PMOS transistor T4 is in the off state (indicated by X), and the transistors T2 and T3 are failed (marked as U). The reading circuit 111 outputs a binary code of 0 or 1 respectively according to the detected conduction state of each transistor T1, T2, T3, T4 and T5, and provides a binary code array (matrix) diagram 100S' (as shown in FIG. 3B). And a binary code sequence of 1,0,0,0,1 can be provided, according to the conduction states of the transistor T1, T2, T3, T4 and T5 read sequentially, which serves as an identifier to verify the identity of the e identities of the physically unclonable function device 100.

By the same way, the physically unclonable function device 200 can provide can provide a binary code array (matrix) diagram 200S' (as shown in FIG. 3B). And a binary code sequence of 0, 0, 0, 1, 1, 1, 1, 0, 0 can be provided, according to the conduction states of the transistor T21-T29 read sequentially, which serves as an identifier to verify the identity of the e identities of the physically unclonable function device 200.

Figure 4A:
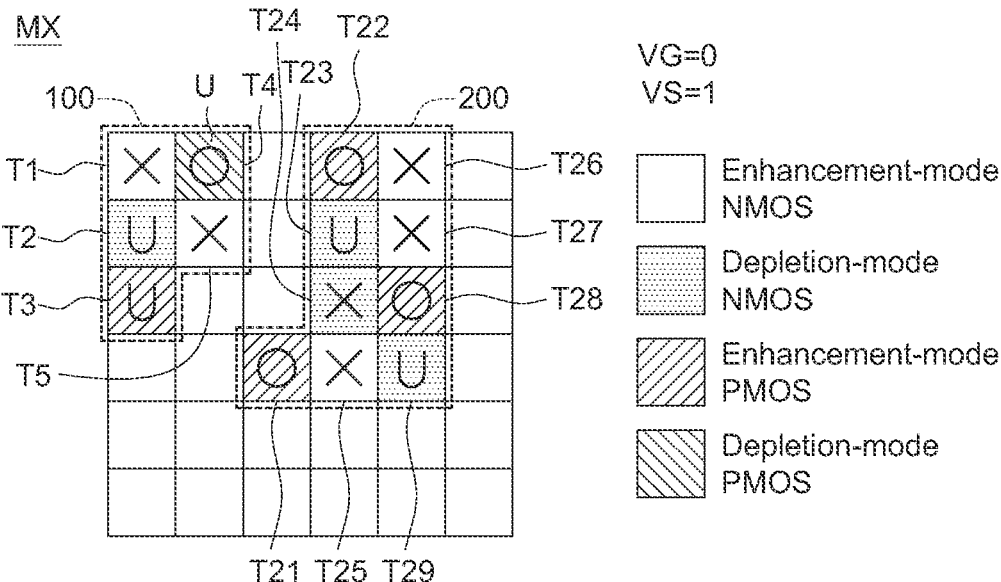
FIG. 4A is a diagram illustrating the conduction states of the transistors in the physically unclonable function device, when a gate voltage of 0V and a source voltage of 1V are applied to these transistors in the transistor array.
Figure 4B:
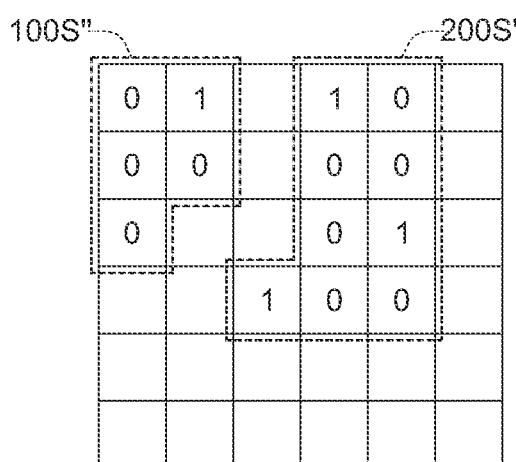
FIG. 4B is a diagram illustrating a binary code array (matrix) diagram corresponding to the conduction states of the transistors in the physically unclonable function device as depicted in FIG. 4A.

FIG. 4A is a diagram illustrating the conduction states of the the transistors T1, T2, T3, T4 and T5 in the physically unclonable function device 100 and the transistors T21-T29 in the physically unclonable function device 200, when a gate voltage VG of 0V (VG=0) and a source voltage VS of 1V (VS=1) are applied to these transistors in the transistor array MX; and FIG. 4B is a diagram illustrating a binary code array (matrix) diagram 100S" and 200S" corresponding to the conduction states of the transistors T1, T2, T3, T4 and T5 in the physically unclonable function device 100 and the transistors T21-T29 in the physically unclonable function device 200 as depicted in FIG. 4A.

In the present embodiment, when a gate voltage VG of 0V (VG=0) and a source voltage VS of 1V (VS=1) are applied to each transistor in the transistor array MX, the enhancement-mode NMOS transistors T1 and T5 are in the off state (indicated by X); the depletion-mode PMOS transistor T4 is in the on state (indicated by O), and the transistors T2 and T3 are failed (marked as U). The reading circuit 111 outputs a binary code of 0 or 1 respectively according to the detected conduction state of each transistor T1, T2, T3, T4 and T5, and provides a binary code array (matrix) diagram 100S" (as shown in FIG. 4B). And a binary code sequence of 0, 0, 0, 1, 0 can be provided, according to the conduction states of the transistor T1, T2, T3, T4 and T5 read sequentially, which serves as an identifier to verify the identity of the e identities of the physically unclonable function device 100.

By the same way, the physically unclonable function device 200 can provide can provide a binary code array (matrix) diagram 200S" (as shown in FIG. 4B). And a binary code sequence of 1, 1, 0, 0, 0, 0, 0, 1, 0 can be provided, according to the conduction states of the transistor T21-T29 read sequentially, which serves as an identifier to verify the identity of the e identities of the physically unclonable function device 200.

In accordance with the aforementioned embodiments of the present disclosure, a physically unclonable function device and the method for fabricating the same are provided. At least one pair of semiconductor transistors including an enhancement-mode MOS transistor and a depletion-mode MOS transistor with the same electrical conductivity are firstly formed in the substrate. By controlling the ion implantation process for forming the doped channel regions of these transistors to make the size of the doped well regions and doped channel regions of the transistors substantially equal to the critical dimensions of the reticles used to form these doped regions, so as to result in at least one of the enhancement-mode MOS transistor and depletion-mode MOS transistor failed, due to process variation. The conduction states of these transistors can be then read by a reading circuit, and a set of numerical values, which serves as an identifier to verify the identity of the device, can be outputted.

When a hardware apparatus with a built-in physically unclonable function device receives the external ciphertext encrypted with this identification code, a verification can be perform immediately based on the identifier and then the external ciphertext can be decoded and back-translated into plain text. This can prevent the loss of the cryptographic key, and prevent the user's identity and digital data from being stolen or tampered with, thereby reducing the risks of system security. Because the identifier provided by the physically unclonable function device is a native cryptographic key generated directly in the hardware apparatus and introducing random variables through the process for manufacturing the hardware. In addition, both the decrypted entropy source and the native cryptographic key can be prepared within microsec, without the support of additional software. Such that the need for additional operation cost (such as the power consumption and accessing time) required by the traditional IoT encryption technology to frequent and repeated access the cryptographic key stored in the hardware apparatus, can be omitted.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A physically unclonable function (PUF) device, comprising:
at least one of a first group of transistors and a second group of transistors,
wherein the first group of transistors comprises:
a first transistor, having a first well with a first conductivity and a first channel region with a second conductivity, wherein when a first gate-source voltage applied to the first transistor is equal to 0, the first transistor is in an off state; and
a second transistor, having a second well and a second channel region both with the first conductivity, wherein when a second gate-source voltage applied to the second transistor is equal to 0, the second transistor is in an off state;
wherein the second group of transistors comprises:
a third transistor, having a third well with the second conductivity and a third channel region with the first conductivity, wherein when a third gate-source voltage applied to the third transistor is equal to 0, the third transistor is in an on state; and
a fourth transistor, having a fourth well and a fourth channel region both with the second conductivity, wherein when a fourth gate-source voltage applied to the third transistor is equal to 0, the fourth transistor is in an on state; and a reading circuit, electrically connected to the first group of transistors and/or the second group of transistors, and used to read a plurality of first conduction states of the first group of transistors and/or the second group of transistors, and then to output a first set of numerical values.

2. The PUF device according to claim 1, wherein the first conductivity is a P-type conductivity, the second conductivity is an N-type conductivity; the first transistor is an enhancement-mode N-type metal-oxide-semiconductor (NMOS) transistor; the second transistor is a failed depletion-mode NMOS transistor; the third transistor is a failed enhancement-mode P-type metal-oxide-semiconductor (PMOS) transistor; and the fourth transistor is a depletion-mode PMOS transistor.

3. The PUF device according to claim 1, wherein the first conductivity is a N-type conductivity, the second conductivity is an P-type conductivity; the first transistor is an enhancement-mode PMOS transistor; the second transistor is a failed depletion-mode PMOS transistor; the third transistor is a failed enhancement-mode NMOS transistor; and the fourth transistor is a depletion-mode NMOS transistor.

4. The PUF device according to claim 1, wherein the at least one of a first group of transistors and the second group of transistors forms a transistor array, or is included in a larger transistor array.

5. The PUF device according to claim 4, further comprising a fifth transistor included in the larger transistor array.

6. The PUF device according to claim 1, wherein the reading circuit is used to apply a first reading voltage to at least one of the first group of transistors and the second group of transistors to read the plurality of first conduction states, and to output the first set of numerical values.

7. The PUF device according to claim 1, wherein the reading circuit is used to apply a second reading voltage to at least one of the first group of transistors and the second group of transistors to read a plurality of second conduction states, and to output a second set of numerical values.

8. The PUF device according to claim 1, wherein the reading circuit comprises:
a column decoder;
a row decoder;
a plurality of word lines (WL), wherein one end of each of the plurality of word lines is electrically connected to the column decoder, and the other end is electrically connected to a gate of a corresponding transistor in the at least one of the first group of transistors and/or the second group of transistors;
a plurality of bit lines (BL), wherein one end of each of the plurality of bit lines is electrically connected to the row decoder, and the other end is electrically connected to a source of a corresponding transistor in the at least one of the first group of transistors and/or the second group of transistors; and
a plurality of inverse bit-line-bars (BLB), each of which is electrically connected to a drain of a corresponding transistor in the at least one of the first group of transistors and/or the second group of transistors.

9. A method for fabricating a PUF device, comprising:
forming a plurality of transistors with substantially the same size in a substrate, wherein the plurality of transistors comprises at least one of a first group of transistors and a second group of transistors,
wherein the first group of transistors comprises:
a first transistor, having a first well with a first conductivity and a first channel region with a second conductivity, wherein when a first gate-source voltage applied to the first transistor is equal to 0, the first transistor is in an off state; and a second transistor, having a second well and a second channel region both with the first conductivity, wherein when a second gate-source voltage applied to the second transistor is equal to 0, the second transistor is in an off state;

wherein the second group of transistors comprises:

a third transistor, having a third well with the second conductivity and a third channel region with the first conductivity, wherein when a third gate-source voltage applied to the third transistor is equal to 0, the third transistor is in an on state; and a fourth transistor, having a fourth well and a fourth channel region both with the second conductivity, wherein when a fourth gate-source voltage applied to the third transistor is equal to 0, the fourth transistor is in an on state; and forming a reading circuit in the substrate, electrically connected to the first group of transistors and/or the second group of transistors, and used to read a plurality of first conduction states of the first group of transistors and/or the second group of transistors, and then to output a first set of numerical values.

10. The method according to claim 9, wherein forming the plurality of transistors comprises:

forming the first well region and the first doped channel region in the substrate using a first reticle, wherein a size of the first well region and the first doped channel region is substantially equal to a first critical dimension (CD) of the first reticle; and forming the second well region and the second doped channel region in the substrate using a second reticle, wherein a size of the second well region and the second doped channel region is substantially equal to a second CD of the second reticle.

* * * * *